United States Patent [19]

Peturis

[11] Patent Number: 4,971,155
[45] Date of Patent: Nov. 20, 1990

[54] ASSEMBLY LINE POTATO HARVESTER

[76] Inventor: Nick J. Peturis, Rt. 1, Box 459, Loxley, Ala. 36551

[21] Appl. No.: 92,557

[22] Filed: Sep. 3, 1987

[51] Int. Cl.$^5$ .......................................... A01D 13/00
[52] U.S. Cl. ..................................... 171/11; 171/18;
171/20; 171/23; 171/28; 171/40; 414/501;
414/540; 414/633
[58] Field of Search ....................... 171/11, 18, 20, 23,
171/27, 28, 40, 130, 138; 198/346; 130/30 P,
DIG. 7; 414/501, 540, 543, 633

[56] References Cited

U.S. PATENT DOCUMENTS

| | | | |
|---|---|---|---|
| 1,800,622 | 4/1931 | Granberg | 130/30 P |
| 2,027,840 | 1/1936 | Rodin | 171/11 |
| 2,365,077 | 12/1944 | Hertzler et al. | 171/28 |
| 2,447,339 | 8/1948 | Dey | 171/20 |
| 2,468,639 | 4/1949 | Sample | 130/30 P |
| 2,711,742 | 6/1955 | Lavers | 171/11 |
| 3,198,259 | 8/1965 | Manuel | 171/40 |
| 3,258,142 | 6/1966 | Girardi | 414/501 |
| 3,340,935 | 9/1967 | Csimma | 198/346 |
| 3,581,747 | 6/1971 | Scribner | 130/30 P |
| 3,587,884 | 6/1971 | Adrian | 414/501 |

FOREIGN PATENT DOCUMENTS 2326215 12/1914 Fed. Rep. of Germany ........ 171/18
511900 6/1976 U.S.S.R. ................................. 171/28

Primary Examiner—Edward K. Look
Assistant Examiner—Therese M. Newholm
Attorney, Agent, or Firm—Gregory M. Friedlander

[57] ABSTRACT

A potato harvester having cooperative elements serving the functions of prividing an overall frame for the harvester with wheels for locomotion. A de-vining system utilizing a de-vining chain running between large top roller and a smaller bottom roller a pallet and worker stand, a sorting area to sort potatoes three ways and an area and system for discharge of filled pallets which cooperate in an assembly line process allowing for the intervention and participation of field workers with an automated process. The chief inventive portions being a pallet stand with an unloading forklift; Separation or sorting of potatoes onto conveyors which load the potatoes into the appropriate pallets depending on size while allowing for separation by hand of large and small potatoes from the average sized into three distinct areas by hand with waste disposal finished by hand; a refined digging and de-vining system designed to clear vines from the potatoes and carrier chain in a assembly line process.

5 Claims, 10 Drawing Sheets

ASSEMBLY LINE POTATO HARVESTER

BACKGROUND of INVENTION

1. Field of Invention

The present invention relates to vine harvesters. More particularly, the invention relates to an assembly line type harvester for sweet potatoes.

2. Prior Art

The following Patents are found in the prior art:

| INVENTOR | DATE ISSUED | U.S. Pat. No. |
| --- | --- | --- |
| United States Patents | | |
| F. L. Hill et al | May 24, 1966 | 3,252,520 |
| A. F. Clarke | Oct. 16, 1906 | 833,705 |
| M. C. Lehde et al | Aug. 17, 1965 | 3,200,888 |
| G. H. Manuel | Aug. 3, 1965 | 3,198,259 |
| W. B. Pridy | July 28, 1959 | 2,896,728 |
| S. Csimma | Sept. 12, 1967 | 3,340,935 |
| Bettencourt et al | Oct. 19, 1976 | 3,986,561 |
| O. L. Looker et al | Jan. 31, 1967 | 3,301,331 |
| Darryl G. Bettencourt | Feb. 18, 1986 | 4,570,426 |
| E. F. Greedy | July 11, 1967 | 3,330,363 |
| David W. Cayton | Oct. 19, 1971 | 3,613,796 |
| William E. Turold | Apr. 21, 1981 | 4,262,477 |
| George Blanchl | Oct. 13, 1981 | 4,294,063 |
| R. L. Button | July 2, 1968 | 3,390,768 |
| Fred E. Lauridsen, Sr. | Aug. 10, 1971 | 3,597,909 |
| German Patents | | |
| Heinrich Behn | Apr. 20, 1953 | 874,083 |
| Field Covered: 171/11,27,40,130,20 | | |

Several patents in the prior art demonstrate the use of various methods of harvesting mechanically tomatoes and potatoes and similar vine crops. Since the major elements of the patent In question are the devining process, sorting process, and discharge process, discussion of the art directed toward how those items have been addressed in the past. The concept of using a conveyer with polarity of rods is old in the art. The use of this in connection with an inclined frame is also old in the art. See patent 3,198,259.

Patents differ in their methods of striping vines. The use of rollers is old, as is shown in FIG. 5 of patent 3,198,259 and even the use of multiple rollers, but not the use of multiple rollers with an intervening or inter-traveling vine carrying chain. Similarly, the use of a gap as in patent 561 is old in the art, but not using the gap prior to the travel of a chain through two rollers.

The use of a shaker is old in the art, as shown in patent 561. Similarly, patent 888 uses a series of rollers, but also without having the inter-traveling chain. Again only the motion of the rollers themselves in 888 provides for the movement of the vines through those rollers.

Patent 063 also shows the use of the roller for capturing vines with only the use of a single roller.

On almost all of the patents some conveyer system is used as stands for separating potatoes and therefore this particular technique is old in the art. The improvement of the present inventions' conveyer system is to provide three separate areas for practical separation of potatoes as is done in the in the preferred technique. In the general course of potatoe harvesting three types of potatoes are generally separate from all others. First, large potatoes, then the more numerous regular potatoes which are the main cash crop and finally the smaller or canner potatoes which are used for seed in cold weather or for canning in warmer weather when they will not store for seed. The present inventions merely takes the conveyer technology which is old in the art and applies it to a technique for sorting potatoes according to the quantity of the various types of potatoes which are normally discharged. Additionally it provides shoots as opposed to openings for discharge in order to direct the debris from unwanted potatoes directly to the ground without getting potentially tangled in the workings of the frame.

A series of pallet stands are provided to hold a line of pallets, five pallets being held behind the workers on the main sorting table, two pallets being held in line with the main potatoe discharge, one pallet being held just for jumbo pallets and two pallets being held just forward for the smaller potatoes. This is a modification which is new in the art. Although various techniques have been used for maintaining pallets, this particular arrangement designed for having three different loading areas with the number of pallets which are usually necessary for each different type of potatoe is a new and improved method of providing for pallets to be carried with the equipment.

The most named improvement over the art in this patent is the use of the forklift conveyer. The use of a barrel conveyer is shown in patent 3,198,259. This particular type of discharge is not adequate due to its failure to allow barrels to be lowered without falling and the general lack of control over the potatoes in a drop.

Similar problems which serve to damage pallets occur with patent 190 which merely dumps the pallets to the side.

The present invention is directed toward having an assembly line or just a line of pallets available for loading potatoes as is shown in patent 259 with one or more barrels, but it provides for a larger number of pallets to be used, for the pallets to be added without stopping the harvesting process, provides a superior method of discharging the pallets without damaging them while the process is moving.

3. General Discussion of the Invention

The present invention provides several improvements over the prior art. The major innovations are designed to allow for improved automated devining while allowing several laborers to work a sorting operation efficiently on a movable platform while maintaining reduced weight on said platform and a continuous sorting and unloading process.

One of the major innovations in the invention is a pallet stand and forklift combination. The forklift is a modified elevator for unloading loaded pallets. It has no independent means of movement, but is, to the contrary, pivotably fixed in place onto the frame of the harvester. The forklift can move from its fixed position to the ground and turn at least 90 degrees for receiving or unloading pallets.

The forks are positioned so that they may be turned to receive pallets coming from a conveyor system for pallets. The pivotal mounting allows for the forklift to drop to the ground along its vertical axis and spin ninety degrees along its hosizontal axis so that the loaded pallet is gently lowered to the ground and can easily slide off of the forks which are then returned to the original position for further unloading.

The forklifts are directly fed from a discharge platform which provides a surface for mounting cross chains which are motor driven and carry unloaded pallets under the main conveyor described below for loading. The cross chains also carry loaded pallets onto the forklift described above for discharge. By having the unloaded and loaded pallet abutt, no dropping potatoes are lost when pallets are changed and no worker need get near the dropping potatoes.

To function most efficiently, the forklift arrangement requires a steady stream of pallets to unload. To accomplish this result, a series of endless conveyors are utilized to provide a moving work area, or assembly line. The concept of working an assembly line along a conveyor is in a manner old in the art. The line is improved in several important aspects. First, chutes or slides are provided beside workers, as opposed to open areas in front of workers as seen in the prior art. In this way, the distance between the worker and conveyor is significantly reduced and, more importantly, the refuse is directed away from working parts of the harvester and directly to the ground by the chutes.

Second, the line is set up to allow workers to work both sides of the main conveyor, allowing workers to sort, clean, work and load from the assembly line into pallets located on either side of the assembly line. This allows the rare extra large potatoes to be separately sorted.

Third, conveyors moving in close proximity, in the preferred embodiment, above, in an opposite direction are provided to allow sorted produce to move to alternate unloading areas. The design is made with an eye toward having a number of workers in a labor intensive process in cooperation with mechanized movement. The design, also enhances separation of potatoes into three sizes as is commonly desired.

The endless conveyors are sufficiently narrow so the workers can reach across the conveyors from either working side. Two working sides being provided.

Fourth, a line of pallets is arranged to feed onto the loading platform feed chains and altimately to the forklift and ground.

In order to provide relatively clean potatoes for the sorting process, several improvements are made to the throat or digging portion of the invention. A shovel for digging is utilized for unearthing the potatoes. The shovel is fixed to an improved throat. In a method known in the art, the vines are tangled and entraped in an upper steel chain or roller system comprised of metal bars stretched between endless metal chains. The potatoes are held from the ground by this outer steel rod chain and by a lower inner hook chain.

A major improvement lies in the de-vining apparatus at the top of the throat. The outer chain moves between small roller under a large roller. The potatoes hang from the outer chain and the inner chain reaches its uppermost point of travel and turns back. This leaves the potatoes hanging from the outer chain. As the potatoes hit the smaller roller they swing underneath the smaller roller and are whipped off the vines. Potatoes not so de-vined are clipped off where the top roller meets the bottom roller. The outer chain passes between the two rollers with the vines. Since the roller must give somewhat as the bars of the outer chain move between, the top roller is made of an elatic material, such as a steel drum coated with a rubber cover and is also flexibly held against the chain. This flexibility is accomplished by having the roller mounted on a pivoted axle. The minimum height of the top roller above the outer chanin is controlled by way of an adjustment on the drum axle. A tensioning means, such as a spring or bungle cord can be used to help hold the top roller in place and provide sufficient, adjustable tension to keep the roller in contact with the outer chain.

A larger top roller is used as a larger wheel passes more easily over the chain then a smaller wheel, causing less vibration and less wear and tear on the chain. The smaller roller on the bottom, aproximately 2 inches in diameter is used. Other smaller roller tends to become entangled in the vine or not rotate and a larger roller becomes too large to impart the swinging action to the hanging potatoes. Obviously, the exact size of the roller would vary according to the type of crop or potato harvested or the varying length of vines.

A further object of the invention is to provide compartmentalized construction techniques for primary frame components to hold down costs of construction and repair.

A further object of the invention is to reduce vibration and damage to potatoes.

A further object of the invention is to quicken harvesting.

A further object of the invention is to reduce weigth carried by the harvester.

A further object of the invention is to provide a method of unloading potatoes in an assembly line process comprising steps for mechanized digging and cleaning of potatoes, labor intensive sorting of potatoes and cleaning for potatoes coupled with mechanized movement and mechanized unloading of filled pallets.

Other objects and advantages of the invention will become better understood hereinafter from a consideration of the specification with reference to the accompanying drawings forming part thereof, and in which like numerals correspond to parts throughout the several views of the invention.

BRIEF DESCRIPTION OF THE DRAWINGS

For a further understanding of the nature and objects of the present invention, reference should be had to the following detailed description taken in conjunction with the accompanying drawings in which like parts are given like reference numerals and wherein.

DETAILED DESCRIPTION OF THE PREFERRED EMBODIMENT

Figure 1:
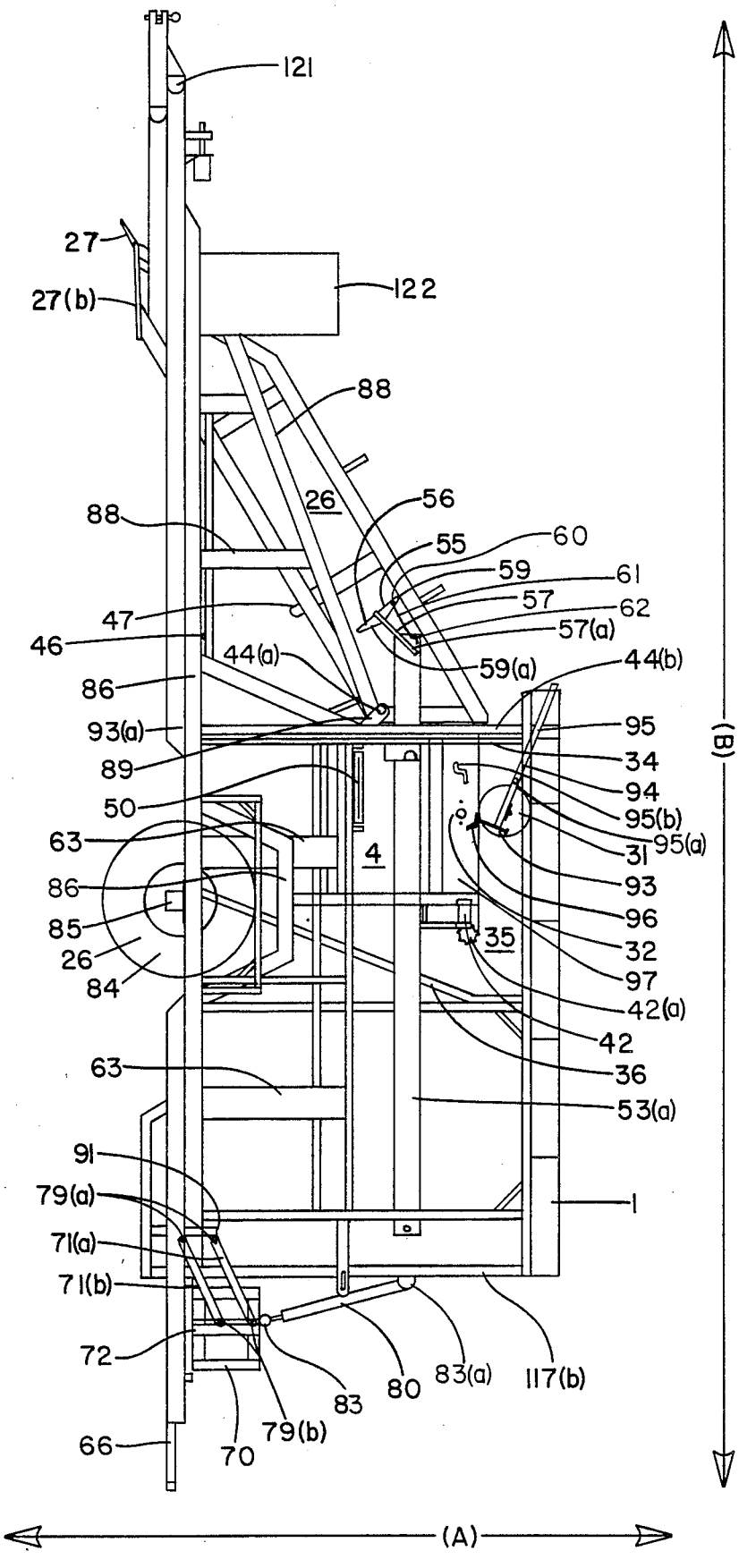
FIG. 1 is a perspective view of the potato digger from a left side or port side perspective.

As can best be seen by reference to FIG. 1 the potatoe harvester 1 is carried by a trailer hitch 121 which may be attached to a tractor (not shown). The main hydraulics 122 are run from the tractor (not shown).

Figure 2:
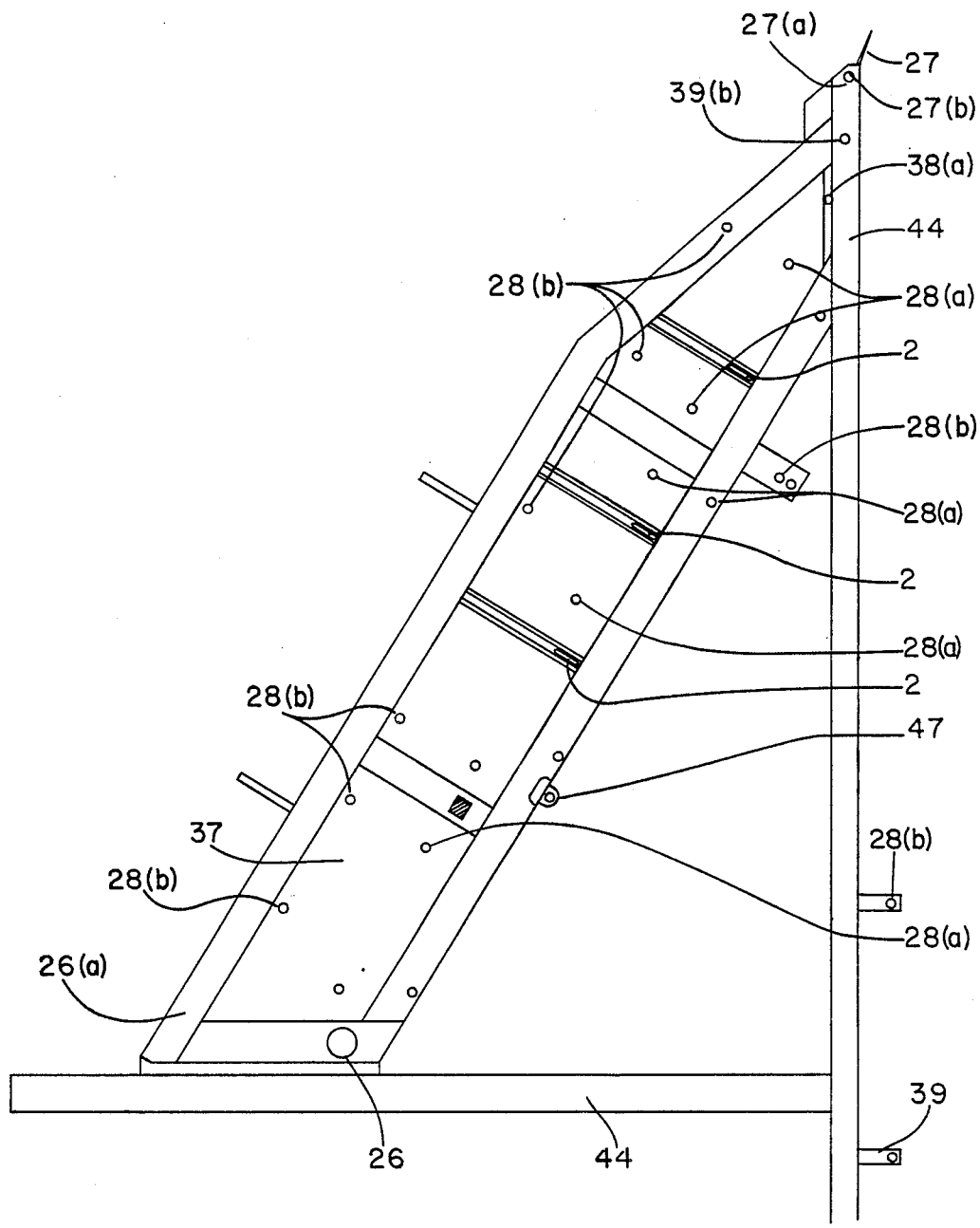
FIG. 2 is an detail of the throat shown in FIG. 1 from the opposite, starboard or right side.

As can best be seen by reference to FIG. 1 the potato harvesting process begins at a throat or digger mechanism 26. Referring to FIG. 2, the front of the throat consists of a cutter blade or shovel 27. Shovel 27 is held onto the frame 44 of throat 26 by means of two brackets 27(a) on either side of the throat which in turn hold the shovel mounting and angle adjustment means 27(b).

Any of the various methods of uprooting potatoes can be used, this method being the preferred method for soft soil. The level of the shovel 27 and angle to the ground may be controlled independently by adjustment 27(b).

In the preferred embodiment, the entire throat 26 is movable along pivots 44(a) mounted on either side of frame member 44. This level is controlled by way of hydraulic cylinder 45 (not shown). As can best be seen by reference to FIG. 1, Cylinder 45 is attached to throat at attachment 47 and is attached to frame 93(a) at attachment 46.

After the potatoes are shoveled up, outside chain 29 and inside chain 30 serve to transport the potatoes a suitable height. Both chains 29 and 30 are endless chains. The outside chain 29 has a circuit which takes it in front of inside chain 30. Inside hook chain 30 comprises bars of metal hooked into one another to form an endless series bars in a manner known in the art. The distance between these bars is sufficient to allow very small clods of dirt to fall through while holding larger potatoes. Inside chain 30 has a front end beginning approximately six inches behind outer chain 29 which is in turn approximately six inches behind the shovel 27. Outside chain 29 has bars with separation of nine inches or more.

Because it is in front of inner chain 30, it first contacts the vines and serves to entrap the vines so that the potatoes are held hanging from Outside chain 29. The distance between the travel of chains 29 and 30 is designed to maximize this effect. A distance of approximately 6 inches has been found sufficient to allow the potatoes to hang or fall to lower chain 30. The height to which the throat carries the potatoes is determined by the need to have the potatoes lifted to the sorting area and to provide sufficient time on said chains 29 and 30 for loose dirt to fall off of potatoes. The lifting may be accomplished by way of conveyor 50 discussed in more detail below.

The movement of chains 29 and 30 is controlled to prevent an undue amount of vibration so as not to injure the potatoes. When dirt becomes a problem, as with moist soil, knockers (not shown) are provided to strike the bottom roller and impart vibration which is otherwise undesirable. The knockers, reside in slides 2 the walls so they may be slid into position when required or slide down out of position. The knockers have an oblong shape and kleets or teeth which catch on the inside chain 30. As the teeth catch on the bottom of the inner chain 30, the knockers turn and the long axis strikes the chain 30 causing the chain 30 to move up and down and vibrate.

As vibration is normally not desired, vibration is controlled by two features of the endless conveyors 29 and 30. First, each chain moves along idler rods 28 and guides 38 and 39. Second a certain amount of slack otherwise provided in each chain 29 is taken out during the run up the throat.

In order to maintain the cargo on chains 30 and 29 and to provide mounting for varying numbers of idler rods 28, the throat 26 has sides or walls 37 which define recesses 28(a) for mounting idler rods for inner chain 30 and recesses 28(b) for outer chain 29. As it is desired that the outer chain 29 run outside the throat, recesses 28(b) are also provided at points away from walls 37. The idlers mounted at 28(a) and 28(b) are four inch rubber rollers with steel backing mounted on a bearing. Their rotation also provides for less vibration.

Oil diverter motor 42 controls the speed of motor 40 which directly drives outer chain 29 by turning an outer sprocket 100. Chain 29 meshes with gears on inner sprocket 101. As it is essential to protect the potatoes that Chains 29 and 30 run at the same speed; a drive chain 40(a) drives an identically sized sprocket 100(a) which drives chain 30 shown on FIG. 4.

Chains 29 and 30 are made to move slightly faster than ground speed of the entire harvester 1 so that chain 29 tends to grab at and entangle vines.

A major innovation in the invention is provided at the upper end 26(a) of the throat 26.

Figure 5:
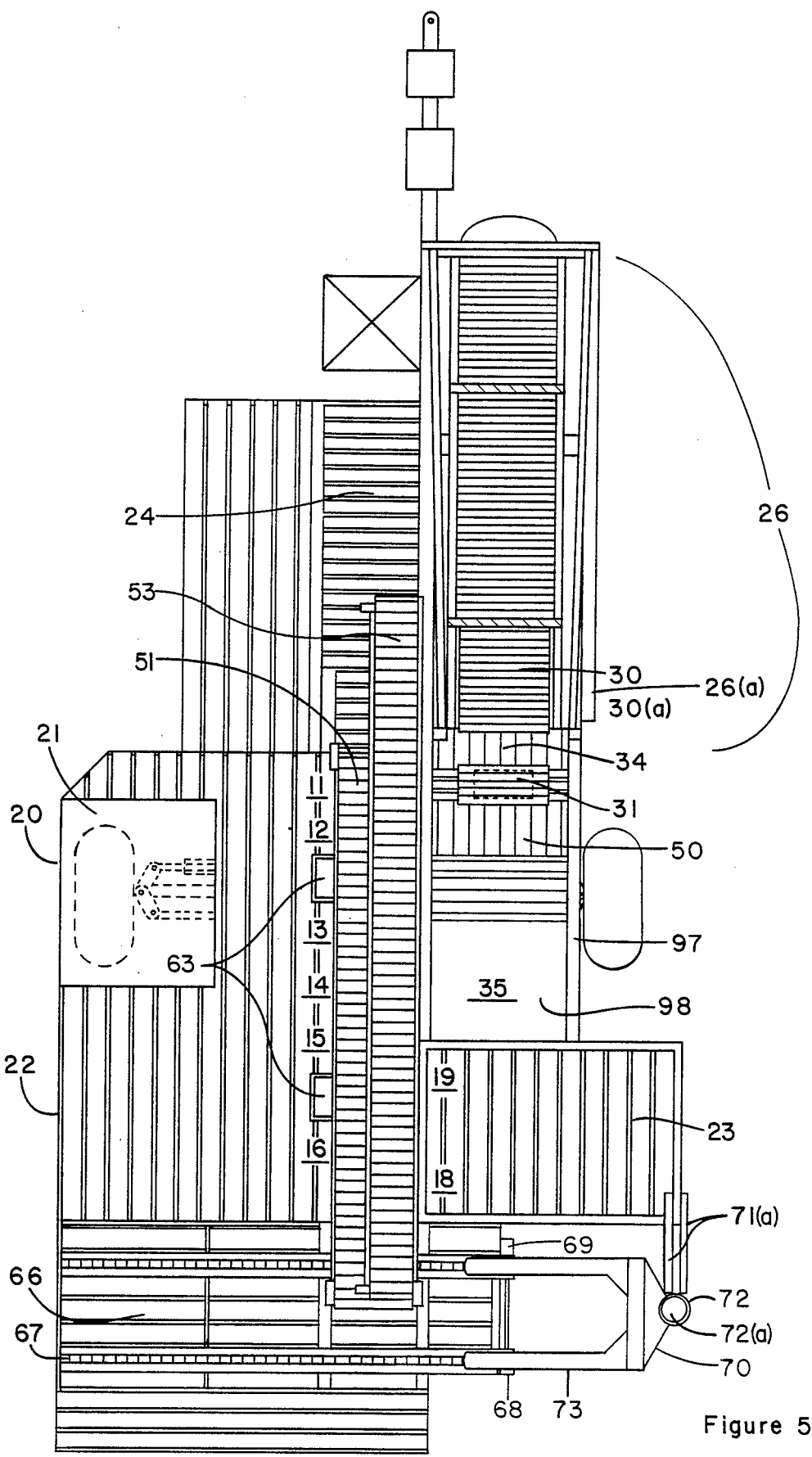
FIG. 5 is an overhead view of the harvester shown in FIG. 1 taken from the B—B axis.

As can best be seen by reference to FIG. 5, inner chain 30 ends at the end of throat 26.

Here a space 34 is defined by the end of the throat 26 which coincides with the end of chain 30, and upper end 29(a) of chain 29 (not shown in FIG. 5), conveyor 50 and the front of rollers 31 and 32 (not shown in FIG. 5 and by side walls 97 (not shown in FIG. 5).

Potatoes loosened from the trip up throat 26 fall directly onto conveyor 50 from inner chain 30. Potatoes still attached to the vine, however, are made to hang from a height between chain 29 and conveyor 50.

Figure 4:
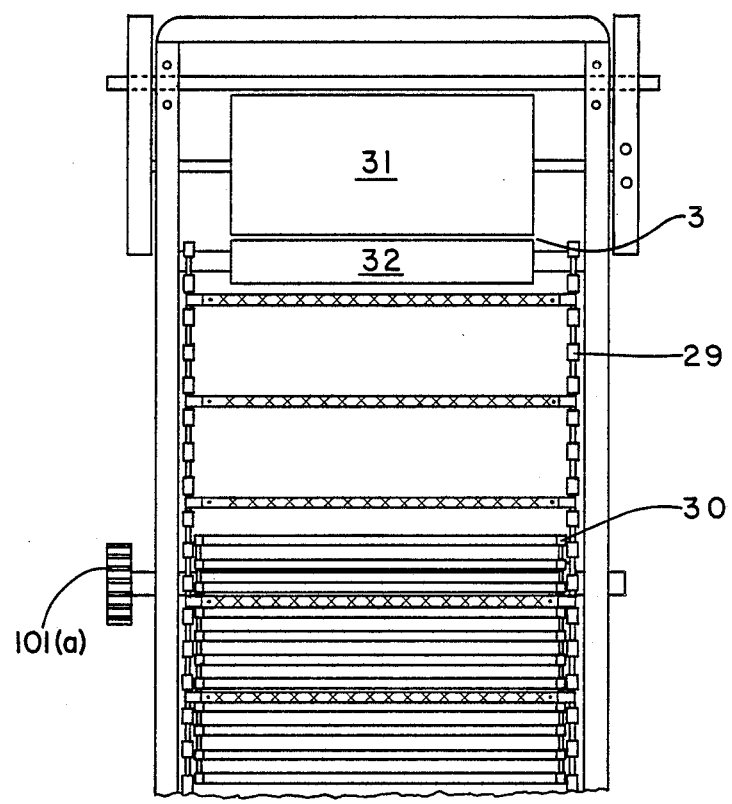
FIG. 4 shows a detailed view of the devining apparatus as seen from axis A—A in FIG. 1.

As can best be seen by reference to FIG. 4, the rollers 31 and 32 serve to contact, frictionally grab and move the outside chain 29. Top roller 31 is rubber coated and bottom roller 32 is metal. Rubber coating is best to prevent undue vibration. Metal is best to allow for less friction to catch vines and similar debris.

Other malleable materials could be substituted for the top roller 31 or other slick materials for bottom roller 32 without departing from the inventive concept.

The potatoes hang from the outer chain 29 and the inner chain 30 reaches its uppermost point 30(a) and turns back. As the potatoes hit the smaller bottom roller 32 they swing underneath the smaller roller 32 and are whipped off the vines as the chain 29 and the vines continue through space 3 between the rollers 31 and 32. Potatoes not so de-vined are clipped off where the top roller 31 meets the bottom roller 32 as said space 3 is not wide enough for the potatoes to pass.

The outer chain 29 passes between the two rollers 31 and 32 with the vines. Since the rollers 31 and 32 must give somewhat as the bars of the outer chain 29 bars move between, the top roller is made of an elatic material, such as a steel drum coated with rubber and is also flexibly held against the chain 29 to reduce vibration.

As can best be seen in FIG. 1, roller 31 is flexiblly held by having the roller 31 mounted on a pivoted axle 94. The height of the top roller is controlled by way of an adjustment shown generally as 93 and 96. This adjustment is a large bolt 93 driven through machined threads on axle 94. Turning the bolt 93 adjusts the height of the roller 31 up or down. The bolt 93 rests on a pad 96 which is welded to the wall 97. The pad has a thin metal top over a rubber cushion on a thicker metal plate. This arrangement provides protection for the rubber and the rubber cushions the up and down motion of the roller 31 to reduce vibration.

A tensioning means, such as a spring or bungle cord can be used to help hold the top roller in place and provide sufficient, adjustable tension to maintain the space 3 or keep the roller in contact with the outer chain. The tensioning means (not shown) is mounted on two hooks 94(a) and 94(b). Hook 94(a) is mounted on the arm of axle 94 between the pivot 95 and the roller 31. Hook 94(b) is mounted on wall 97.

A larger top roller 31 is used as a larger wheel passes more easily over the chain then a smaller wheel, causing less vibration and less wear and tear on the chain 29. The smaller roller 32 on the bottom is aproximately 2 inches. A much smaller roller tends to become entangled in the vine or not rotate and a larger roller becomes too large to impart the desired swinging action to the hanging potatoes. Obviously, the exact size of the roller 32 would vary according to the type of crop or potato harvested or the varying length of vines.

Any potatoes not separated by this process are dislodged at the point where rollers 31 and 32 contact the chain 29 and vines. In this way, all potatoes, free of vines, are deposited on conveyor 50. Conveyor 50 is featured with rubber features to cushion the hull of the potatoes.

The rollers 31 and 32, driven into rotation by chain 29, serve to pull vines away from the potatoes. Roller 31 moves counter clockwise and roller 32 moves clockwise so that their movement cooperates to pull chain 29 and vines. Except for the action of the chain 29, rollers 31 and 32 are free to rotate on bearings.

Figure 3:
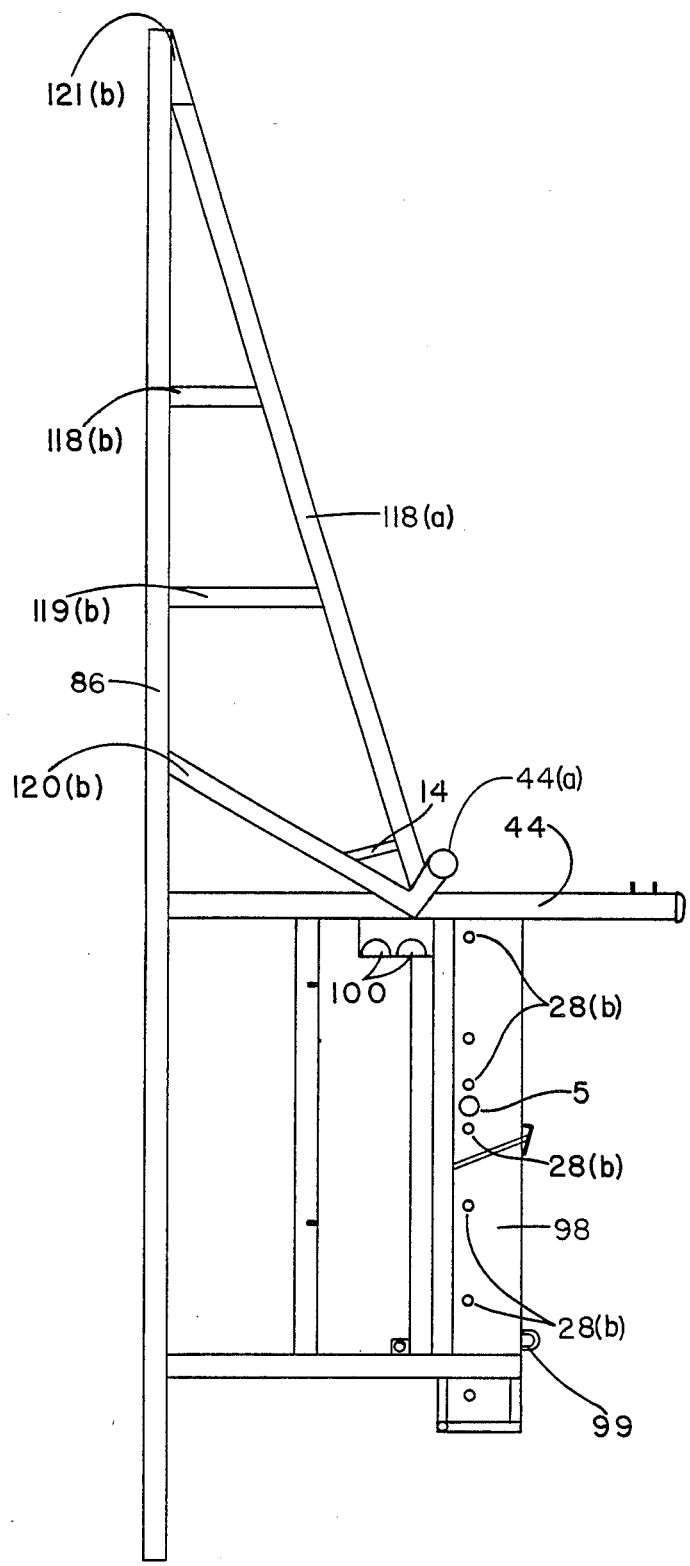
FIG. 3 shows a detailed view of the throat and devining area along the port side of FIG. 1.

A second space 35 is defined by the walls 97 the opposite side of rollers 31 and 32 relative to the throat 26, and a flat plate 98 mounted by bolts 98(a) as shown in FIG. 3. This space 35 is approximately 21 inches to provide for straight travel of chain 29 and vines, etc. Plate 98 is necessary to prevent debris from falling through to the sorting area. Chain 29 must travel straight back through space 35 over plate 98 to allow proper function of rollers 31 and 32.

FIG. 1 shows the end of space 35, chain 29 turns downward in its travel. Here the drive motor 42 turns the sprocket 42(a) which drives chain 29. As shown in FIG. 2, chain 29 is held onto sprocket 42(a) by a teflon wheel 42(b). Stem diverter 36 is provided behind space 35 to prevent vines from becoming entangled with the axle or other rearward portions of harvester 1. Diverter 36 also serves to guide vines under the wheel so they are pressed into the ground. Guide 39 directs chain 29 in close proximity to the ground in order to drag off any vines which might otherwise travel back along the system described above.

Potatoes separated as set forth above fall onto cross conveyor 50 which takes the potatoes to the sorting area.

The sorting area is defined by a series of endless conveyor belts and a combination worker/pallet stand 20. Conveyor belts 50 and 51 are feathered rubber over metal bars. The feathers serve to cushion the fall of potatoes onto those belts. The spaces are small enough between the bars to prevent loosing potatoes but small dirt clods may fall through. Belt 53 may be of any design, but an endless unbroken belt can be used to prevent the smaller potatoes put on this belt from falling through.

Potatoes are carried to the sorting area by way of conveyor 50 which catches potatoes from the throat 26. Potatoes, some loose dirt clods and some leaves are transferred to First sorting belt or conveyor 51. Conveyor 50 may be angled upward or downward slightly in order to lift the potatoes to a suitable height. Conveyor 50 terminates above the first sorting conveyor 51.

Human sorting takes place along endless loading conveyor 51 which moves toward the rear of the harvester 1. A second endless sorting conveyor 53 is provided at approximately 9 inches above the first conveyor 51. The height of this second conveyor 53 is controlled by the need to have workers easily lift small potatoes from the first conveyor 51 to the higher second conveyor 53.

The width of these belts is controlled by the need to have workers able to reach across the belt 51 without discomfort. Endless conveyors 51 and 53 are spaced rubber encased steel chain to allow small dirt to fall through, but close enough to catch and hold small potatoes.

Second conveyor 53 terminates forward of first conveyor 51 a sufficient distance so that a pallet may be placed behind the point of termination of conveyor 53. Pallet stand system 20 has a forward pallet stand 24 which extends forward sufficiently to provide a space to place a pallet between the termination of first conveyor 51 and termination of second conveyor 53 and for a second pallet to be placed forward from where the second conveyor 53 ends.

Frame cross beam, FIG. 1, 53(a) has an pivot 57(a) for attachment of a lever arm 57 which pivotably hangs more or less perpendicularly and downward from said frame cross beam 53(a). At the bottom end of arm 57 is a rocker arm 59. Rocker arm 59 has walls 59(a).

Rocker arm 59 is wider than conveyor 53 and sufficiently wide so that potatoes falling from conveyor 53 are caught in said arm 59. It may have sides 59(a) to prevent potatoes from falling off the sides of said arm 59.

Rocker arm 59 is attached to arm 57 towards the rear of rocker arm 59. In this way, the front of the rocker arm 55 is heavier than the rear of the rocker arm 56 so that the rocker arm is biased and tilts toward the front pallet on stand 24. Rocker arm 59 is sufficiently long so potatoes falling into the rocker arm 54 in turn fall forward into the forward pallet at a desired point.

The top end of lever arm 57 has a process or hole 60 which receives a rope 61. A latch 62 is provided so that when the rope is tensioned it may be fixed in place by latch 62. The latch 62 need be no more than a hook to recieve a knot in rope 61.

In this way, tension on rope 61 off sets the weight differential of the front 55 and rear 56 of rocker arm 54 so that rocker arm 54 tilts in the other direction and potatoes then fall into the pallet behind the termination point of conveyor 53.

Along points at which workers stand along conveyor 51, chutes 63 are provided. These chutes 63 are provided beside, not in front of workers, so that they do not interfere with workers ability to reach across conveyor 51 and up to conveyor 53. Additionally, chutes 63, as opposed to mere openings, direct debris to the ground away from working parts of the system where they might build up.

In the preferred embodiment the pallet stand 24 runs below and even with the port side of conveyors 51 and 53, behind conveyor 51 and in front of conveyor 53 a sufficient distance in each case to allow a pallet to be inserted, and along a portion of the starboard side of conveyor 51 a sufficient length and width to allow two persons to stand with a pallet behind them.

Positions or stands 11, 12, 13, 14, 15 and 16 are provided for persons to stand next to chutes 63 for sorting potatoes as small and regular sizes. Persons in positions 11 through 16 pick clean the regulars and large potatoes on conveyor 51 depositing waste in chutes 63 and small potatoes onto conveyor 53.

Persons in position 18 and 19 pick jumbo potatoes, also known as "number twos" and deposit these in a pallet behind them on jumbo stand 23.

The average size of a pallet is 45"×40"×36"(height).

An additional person can stand comfortably at position 17 to alternate with the persons at positions 11-16 and 18-19 and to handle pallet boxes.

The pallet stand 20 has a flat wheel cover platform 21 over one of two rear wheels 26 which is sufficiently wide to hold a single pallet. This stand 20 is raised in order to allow clearance for wheel 26. Rearward and continuous with said platform 21 is the main pallet platform 22 sufficiently wide for 2 pallets to sit side by side. It is lower to adjust for proper height for the average worker to pick potatoes from conveyor 51 and move them up to conveyor 53 and is sufficiently low so a pallet may be stacked on top of either of the two pallets on platform or stand 22.

Opposite platform 22 is flat jumbo platform 23 for person stands 18 and 19 and a single pallet at the same height as stand 22. A chute 63 may also be provided for these persons. Controls for the forklift 70 and cross chains described below can be convieniently placed to be reached by the workers on platform 23 due to their proximity to the forklift 70.

Figure 6:
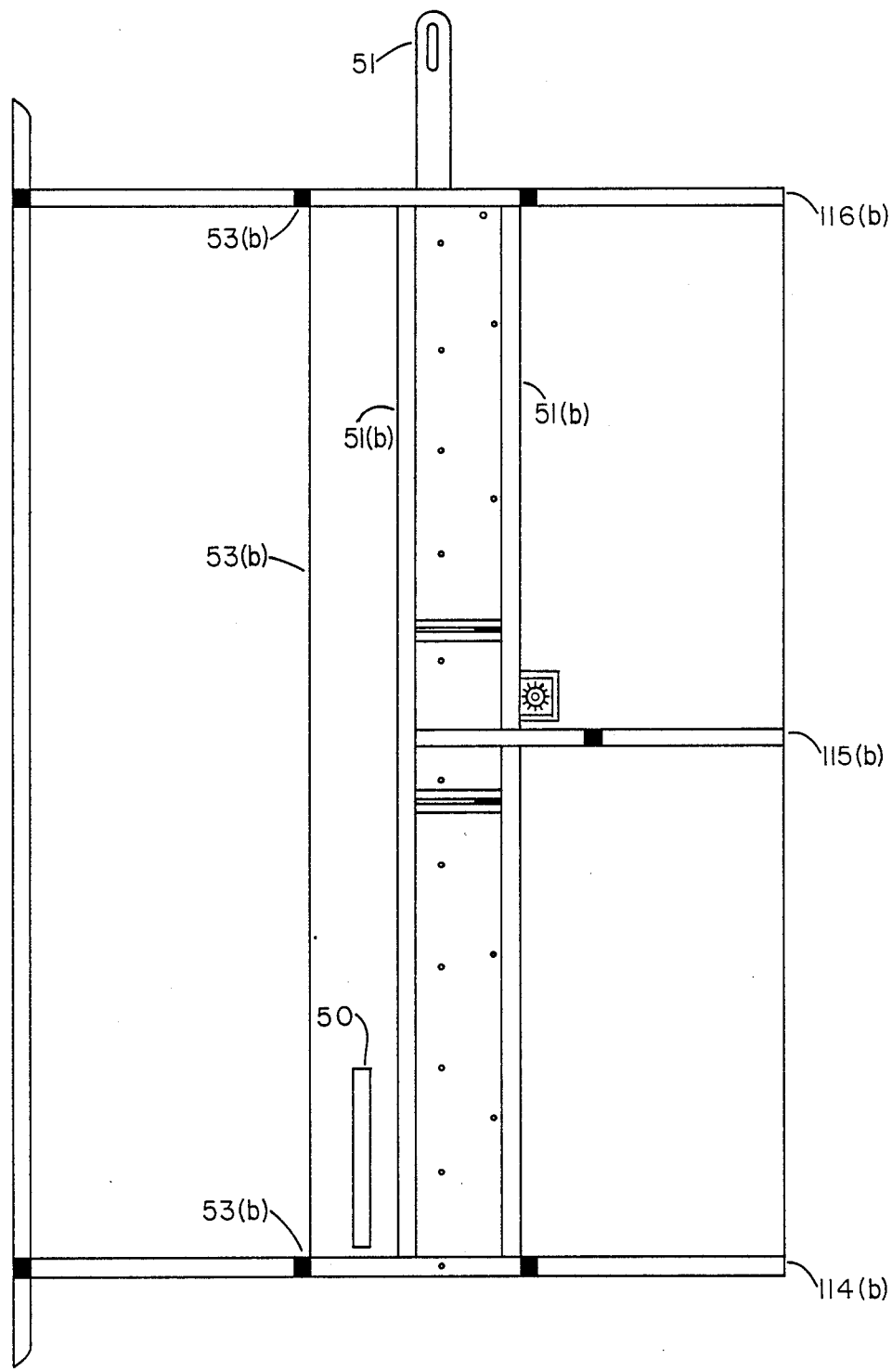
FIG. 6 is a detail of the conveyor frame taken along the port axis as shown in FIG. 1.

Behind main pallet platform 22 is a pallet loading and discharge platform 66 shown in FIG. 6. This platform is part of a discharge system 65 consisting of platform 66, cross chains 67 and forklift 70 which enables the vehicle to tote less weight because potatoes are unloaded without needing an additional vehicle alongside. Platform 66 is lower than platform 22 in order to put the pallets loaded below the discharge for conveyor 51.

Platform 66 is wide enough for one pallet and long enough for two pallets to sit side by side. Cross chains 67 for moving pallets may be driven by hydralic motor 69 in the preferred embodiment and run the length of this platform 66. Rollers could be used without departing from the inventive concept. The port side of this platform is continuous with the rear end of main platform 22. The starboard side is continuous with and directly below the rear termination point of conveyor 51. In this way, potatoes coming off of conveyor 51 fall into the pallet on the starboard side of platform 66.

As the starboard pallet is filled, the port pallet is slid against the starboard pallet and the starboard pallet is moved onto the forklift 70 while simultaneously the port pallet is moved to the starboard position for continuous loading.

The pallets on the main platform 22 and wheel cover platform 21 are then moved to the port position of platform 66 for repeating the process.

Cross chains 67 continue on extensions 68 of platform 66 to facilitate transfer from platform 66 to forklift 70. These extensions 68 are metal rods welded onto the frame below platform 66 which define holes for mounting the forward sprockets for the cross chains 67.

Forklift 70 has a no spill feature. It is also designed to lessen the weight carried and the number of vehicles necessary for the function of harvesting potatoes.

Forklift 70 is positioned behind platform 23. It is attached to frame 93 on pivots 79(a) and 79(b) by way two rocker arms 71. Pivots 79(b) are attached to an outer pipe 72. Within outer pipe 72 is an inner pipe 72(a). Pipe 72(a) moves freely within pipe 72. The forklift tongs 73 are connected by way of frame 81 to inner pipe 72(a). This allows the inner pipe 72(a), and consequently, forklift tongs 73 to turn 180 degrees or more. A turn of 90 degrees is desired to unload pallets.

Figure 9:
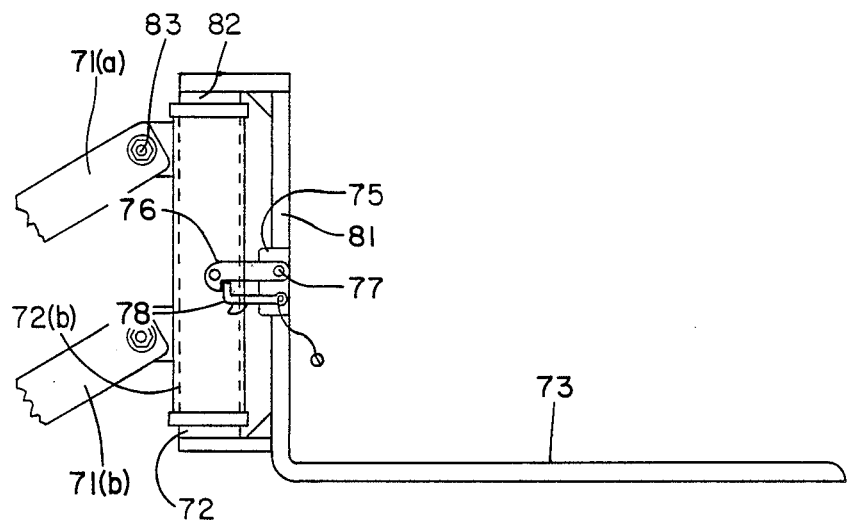
FIG. 9 is a detail of the latch mechanism used for securing the forklift.

Forklift movement up and down (along the vertical axis) is handled by way of hydraulic cylinder 80 connected to frame cylinder 72 pivotally at pivot 83 and connected to the forklift pivotally at pivot 82 shown in FIG. 1. Forklift movement parallel to the ground (along the horizontal axis) is facilitated by a frame 81 attached to the inner cylinder 72(a) shown in FIG. 9. Frame 81 is easily controlled by an individual. Frame 81 is designed to provide leverage as well as a raised grip.

In order to prevent the forklift from pivoting and to hold the forklift in place to receive pallets while the cross chains 67 are in use, a forklift catch mechanism 75 is used to hold the forks 73 in position for catching loaded pallets.

Figure 10:
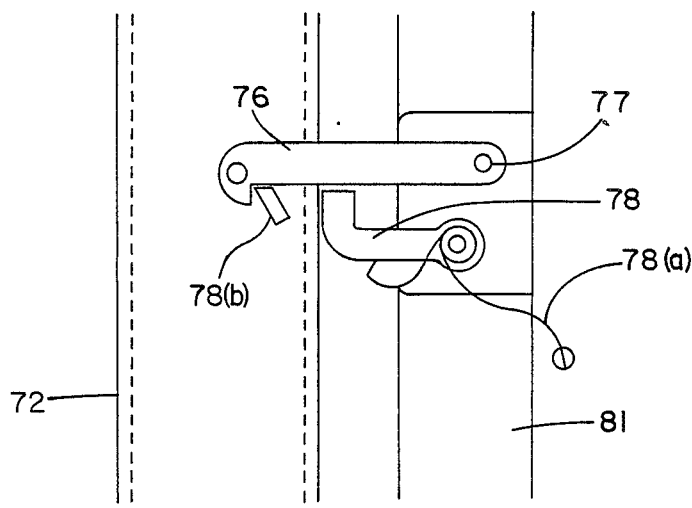
FIG. 10 is an enlargment of the latch shown in FIG. 9.
Figure 11:
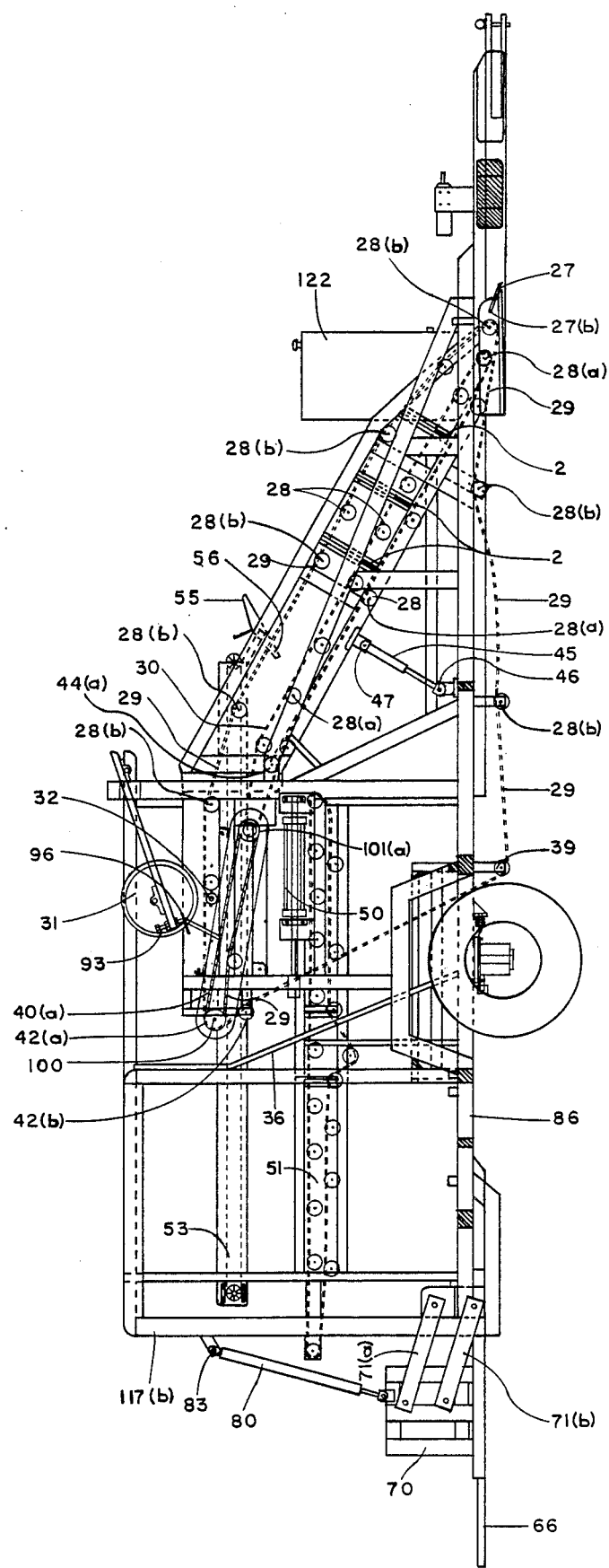
FIG. 11 is a side view of the invention.

As can best be seen in FIG. 10, this mechanism 75 consists of a latch 76 mounted and pivoted about its center at pivot 77 welded onto frame 81. Latch 76 rests on hook 78(b) which is welded onto outer pipe 72. One end of said latch 76 is biased into contact with a pivoted trigger 78. Below and in contact with the trigger 78 is a pivoted stiff wire 78(a) which extends beyond frame 81. When a pallet is loaded onto the forklift forks 73, the wire 78(a) is pushed up against trigger 78 which in turn pushes up latch 76 over hook or catch 78(b) so the entire forklift 70 may pivot around pivot 72 shown in FIG. 9.

The frame as shown in FIG. 1 for holding the entire harvesting equipment is designed to facilitate assembly and repair. The assembly is mounted on an axle 85 in turn mounted on a set of rear wheels 84. Main lower structural members 86 bend over wheels 84 but are otherwise level to the ground approximately 16" off the ground. Cross members 87 hold the main members 86 together. An upper triangle 88 supports throat 26. Bracing members 89 holds triangle 88 pivotally to allow for the throat to move. A single rear leg 91 is placed to attach the forklift mounting bar 71. Additional members are present to hold the motor bracing 90. Finally, the main members 86 are connected by way of a hitch 121 to a tractor from which the hydraulics are powered.

Figure 7:
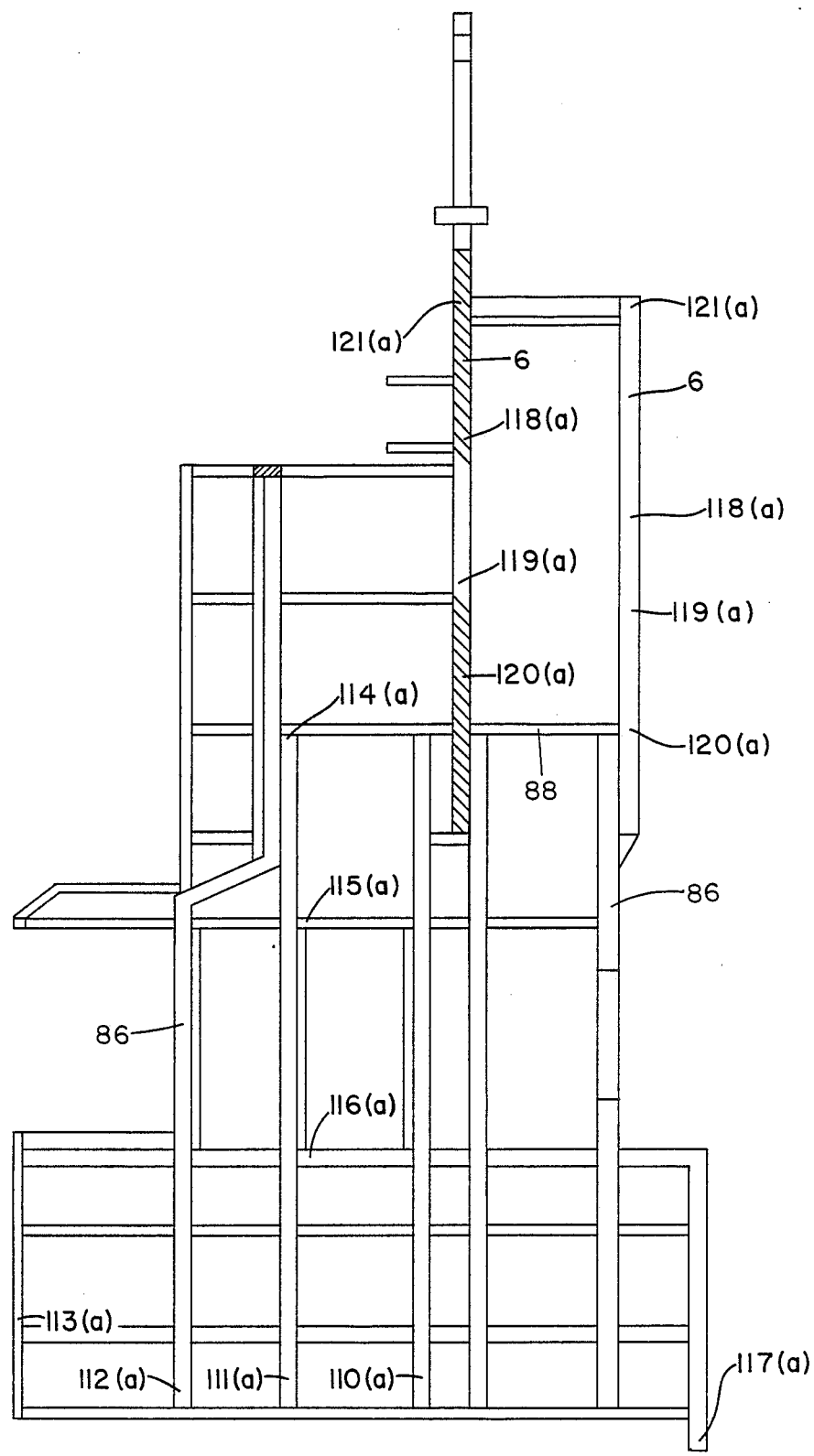
FIG. 7 is a detail of the front mounting frame as seen from the top B—B axis as in FIG. 5.

As can best be seen by reference to FIG. 1, the main frame is supported by axle 85. FIG. 7 shows the remainder of the main frame. Throat support beams 118(b), 119(b) and 120(b) shown on FIG. 3 are mounted at welds on throat frame beams 86 shown in FIG. 7. These memebers serve to support beam 44 and pivot 144(a) which carries the movable throat 26.

A conveyor belt frame is welded to beam 111(a) as shown in FIG. 7. The conveyor belt vertical frame members 114(b), 115(b) and 116(b) are shown in FIG. 6. Beams 51(b) support the lower conveyor. Second conveyor 51 is supported by a cross bar (not shown) which is welded on the conveyor belt frame at weld positions 53(b).

Figure 8:
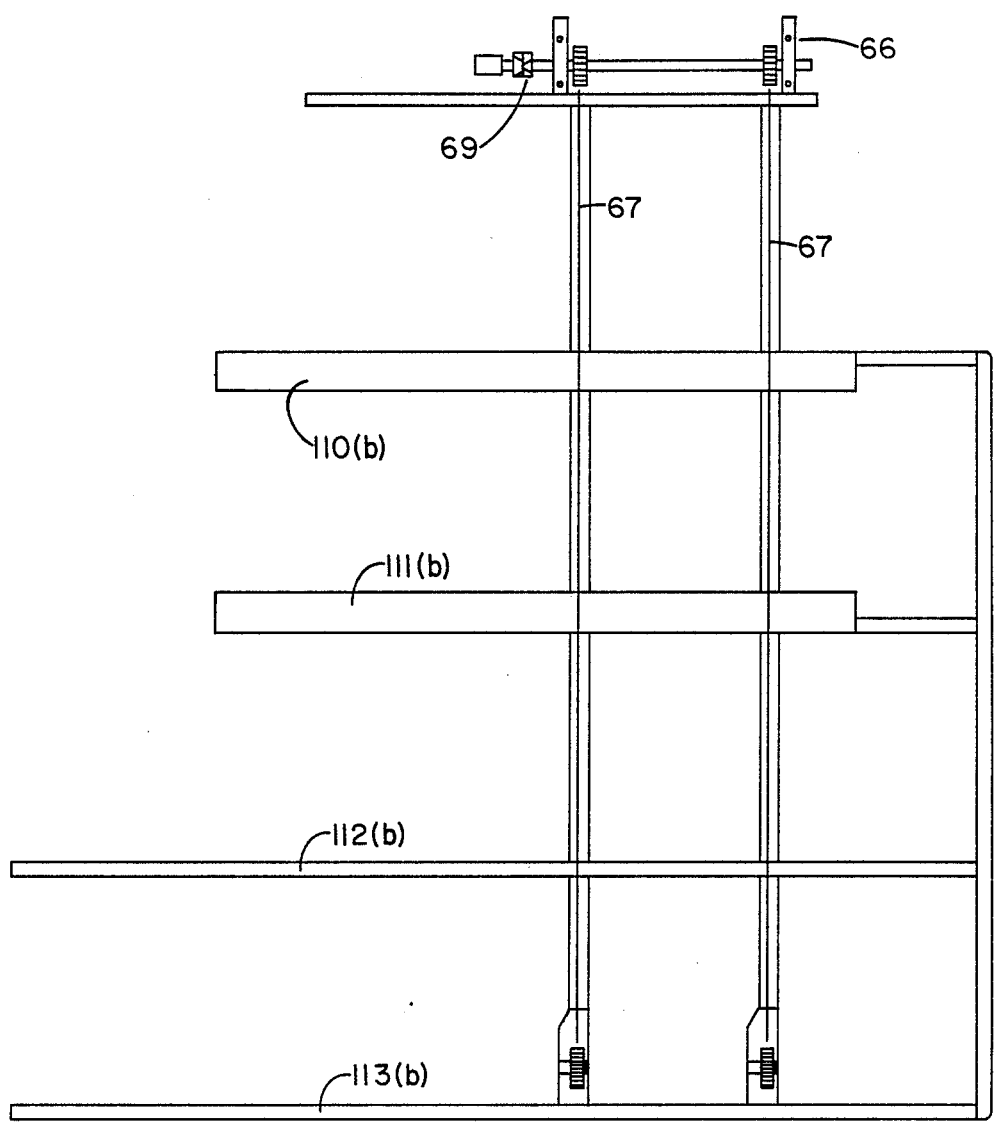
FIG. 8 is a detail of the fantail or rear mounting frame as seen from the top B—B axis as in FIG. 5.

As the discharge platform 66 need to be below discharge point for conveyor 51 a sufficient distance for a pallet to be inserted, a lower fantail frame shown in FIG. 8 is provided. Fantail frame members 110(b), 111(b) 112(b) and 113(b) attached to said rear support bars 110(a), 111(a), 112(a) and 113(a) shown in FIG. 7. A forklift mounting beam 117(a) is provided for mounting the forklift away from and free from fantail frame members 110(b), 112(b), 113(b).

The fantail provides further support for beams 66 which support the axles for cross chain 67 and support for hydrualic motor 69 which drives the cross chains 67.

Because many varying and different embodiments may be made within the scope of the inventive concept herein taught and because many modifications may be made in the embodiment(s) herein detailed in accordance with the descriptive requirements of the law, it is to be understood that the details herein are to be interpreted as illustrative and not in a limiting sense.

What is claimed is:

1. A potato harvester pallet system for holding pallets to receive potatoes from a conveyor and lowering pallets from a loading platform on a frame comprising:
   (a) a forklift having at least one fork and pivotally mounted on the potato harvester frame and capable of being positioned on the pallet system with the fork facing the pallets being loaded and capable of being lowered to the ground level from the harvester frame and turning about its horizontal axis to allow the pallets to slide off;
   (b) a means for delivering pallets to the fork;
   (c) a pallet loading and discharge platform for supporting pallets;
   (d) at least one cross chain mounted on the platform traveling from the point at which pallets are loaded and in the direction of the forks to a position under the forks.

2. The potato harvester of claim 1 wherein the loading platform communicates with a sorting platform running parallel to the conveyor, the sorting platform being sufficiently wide to allow at least one row of pallets to be stacked behind workers on the sorting platform.

3. In a potato harvester having a digging system for digging potatoes a de-viner comprising:
   (a) a frame;
   (b) a plurality of idlers mounted along the frame;
   (c) an endless outside chain traveling along said idlers held more or less parallel to the ground by said idlers at the highest point of travel of said chain;
   (d) an endless inside chain traveling mounted on said frame and within the travel of the outside chain;
   (e) a top roller mounted on said frame above and in contact with the top of said outside chain at a point after the outside chain begins parallel travel;
   (f) a bottom roller mounted on said frame and in contact with the bottom of the outside chain and directly below the top roller;
   (g) a holding means to hold the outer chain more or less parallel prior to and after passing through the top roller and bottom roller;
   (h) driving motor means for causing said outside chain and said inside chain to move along the path set forth above;
   (i) a lower plate attached to frame to guide debris past the rollers below the outside chain and on the opposite side of rollers from the termination point of the inside chain.

4. The harvester of claim 3 further comprising two side plates attached to the lower plate on either side of the outside chain and rising more or less perpendicular to the lower plate.

5. A potato harvester throat comprising:
   (a) a main frame;
   (b) a throat frame;
   (c) a endless inside chain mounted on the throat frame;
   (d) an endless outside chain mounted on the throat frame traveling parallel to the ground at a point past the termination of the inside chain;
   (e) a top roller mounted on the throat frame above the top of the outside chain where the outside chain travels parallel to the ground;
   (f) a bottom roller mounted on the throat frame and below the bottom of the outside chain and directly below said top roller;
   (g) driving means for causing said outside chain and said inside chain to move along the path set forth above;
   (h) a surface for receiving potatoes below the outside chain between the termination point of the inside chain and the rollers a sufficient depth below the outside chain to allow potatoes to hang from vines suspended on the outside chain above the surface attached to the throat frame;
   (i) a guide means attached to this frame directing travel for the outside chain located behind the rollers from the termination point of the inside chain to allow the outside chain to travel more or less parallel to the ground past the rollers;
   (j) a means for holding the top roller in yielding contact above the outside chain;
   (k) guides for directing the movement of the outside chain so that the outside chain travels below the main frame in close proximity to the ground;
   (l) a lower plate attached to the frame to guide debris past the rollers below the outside chain where the outside chain moves past the rollers;
   (m) two side plates attached to the lower plate on either side of the outside chain and rising more or less perpendicularly from the lower plate to guide debris.

* * * * *